J. V. B. CARTER & J. DWYER.

Base-Burning Stoves for Heating and Cooking.

No. 5,927. Reissued June 23, 1874.

Witnesses
R. R. Dyer.
Chas Thurman.

Inventors
John V. B. Carter
James Dwyer.
by Geo. W. Gridley & Co.
Jens Attys

AM. PHOTO-LITHOGRAPHIC Co. N. Y. (OSBORNE'S PROCESS.)

UNITED STATES PATENT OFFICE.

JOHN V. B. CARTER AND JAMES DWYER, OF DETROIT, MICHIGAN, ASSIGNORS TO THE DETROIT STOVE WORKS.

IMPROVEMENT IN BASE-BURNING STOVES FOR HEATING AND COOKING.

Specification forming part of Letters Patent No. 131,936, dated October 8, 1872; reissue No. 5,927, dated June 23, 1874; application filed March 9, 1874.

DIVISION B.

*To all whom it may concern:*

Be it known that we, JOHN V. B. CARTER and JAMES DWYER, of Detroit, in the county of Wayne and State of Michigan, have invented an Improvement in Base-Burning Heating-Stoves, of which the following is a specification:

The nature of our invention relates to certain improvements in that class of heating-stoves known as "base-burners;" and the invention has for its objects the attachment to such stoves of a low-down oven, which may be attached so that baking and cooking generally may be successfully carried on, instead of being merely a hot closet, as has heretofore been the case. This oven should be attached at or near the plane of the fire pot, and so arranged with relation to the flue, that at will the heated currents may be utilized to heat the oven before they find an exit into the smoke-pipe, while, at the same time, its immediate proximity to the fire-pot will enable the direct radiation from said fire-pot to partially heat the oven, which we technically term a "low-down oven," in contradistinction to the ovens heretofore attached to base-burning stoves above the mica section, and generally back of the magazine.

Figure 1:
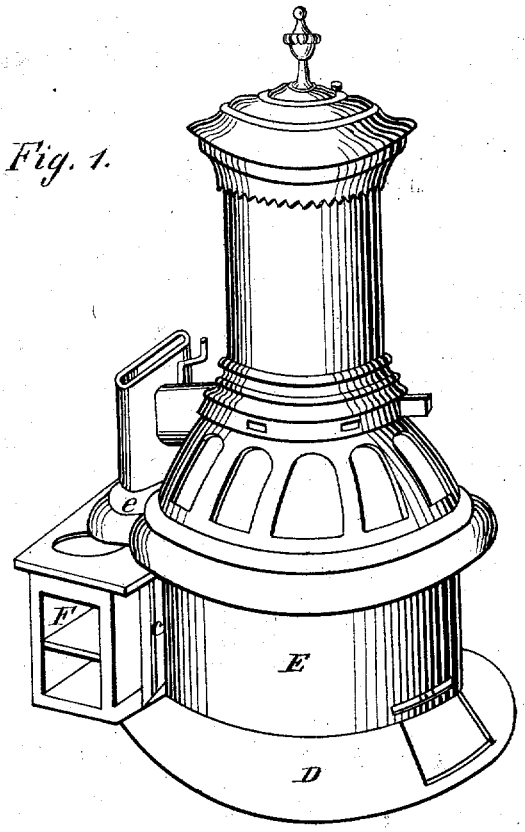
Figure 2:
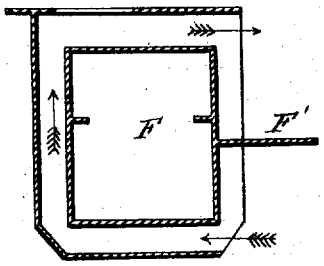
Figure 3:
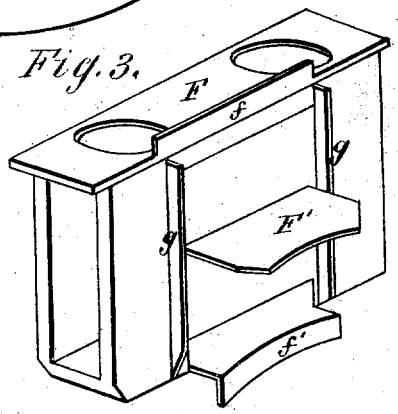

Figure 1 is a perspective view of a base-burning heating-stove, provided with our "low-down" oven attachment. Fig. 2 is a cross-section of the oven. Fig. 3 is a perspective view of the oven detached.

Like letters refer to like parts in each figure.

The oven has a flange, *f*, at the top front edge, which hooks under the ring at the base of the flue-collar *e* of the stove, and under a flange, *f'*, at the lower front edge of the opening in the back of the base-ring D, which holds it in place. It has also two vertical ribs, *g*, which embrace the edges of the flanges *c* of the fire-pot section E, to make a gas-tight joint when properly cemented. It is also provided with a horizontal partition-plate, F', extending to the fire-pot, so that when the draft is reverted through the base of the stove this plate will arrest the upward passage of the heated currents through the back flue, and compel them to pass around three sides of the double oven before finding exit through the top or collar *e* of the back flue, as shown by the arrows in Fig. 2. The oven is double-walled, as shown in the drawing, from which its construction will be readily understood.

It will be seen that this arrangement of the oven at or near the plane of the fire-pot not only allows the oven to be heated for culinary purposes at will, but it keeps the oven warm at all times by direct radiation from the fire-pot when the draft is not reverted.

What we claim as our invention, and desire to secure by Letters Patent, is—

In combination with a heating-stove, a low-down double-walled oven provided with the plate, F', said oven being located in rear of the fire-pot of the stove, and having its upper and under surfaces in the same planes or nearly in the same planes with the upper and under surfaces of said fire-pot, substantially as shown.

JOHN V. B. CARTER.
JAMES DWYER.

Witnesses:
H. S. SPRAGUE.
JAS. WEST.